United States Patent
Ogura (10) Patent No.: US 7,530,615 B2
(45) Date of Patent: May 12, 2009

(54) CONSOLE-SLIDING STRUCTURE

(75) Inventor: Mitsuo Ogura, Aichi-ken (JP)

(73) Assignee: Toyoda Gosei Co., Ltd., Aichi-pref. (JP)

( * ) Notice: Subject to any disclaimer, the term of this patent is extended or adjusted under 35 U.S.C. 154(b) by 0 days.

(21) Appl. No.: 11/902,381

(22) Filed: Sep. 21, 2007

(65) Prior Publication Data

US 2008/0093873 A1    Apr. 24, 2008

(30) Foreign Application Priority Data

Oct. 18, 2006   (JP)   .............................. 2006-283469

(51) Int. Cl.
*B60J 7/00*   (2006.01)
(52) U.S. Cl. .................... 296/24.34; 296/37.8
(58) Field of Classification Search ................ 296/37.8, 296/24.34; 224/400, 281, 548
See application file for complete search history.

(56) References Cited

U.S. PATENT DOCUMENTS 6,203,088 B1 *   3/2001   Fernandez et al. ......... 296/37.8

FOREIGN PATENT DOCUMENTS

| JP | A-2000-255324 | 9/2000 |
|---|---|---|
| JP | A-2000-264132 | 9/2000 |
| JP | A-2003-2123 | 1/2003 |
| JP | A-2004-210006 | 7/2004 |

* cited by examiner

*Primary Examiner*—Joseph D Pape
(74) *Attorney, Agent, or Firm*—Posz Law Group, PLC (57) ABSTRACT

A sliding structure slidably supports a wheel by a groove of a rail. The wheel is rotatably supported to a movable console through a supporting shaft. The sliding structure includes an elastic deforming portion which is elastically deformed when an overload is vertically applied to the movable console and is restored to the original state when its application ceases; an ascending/descending portion which descends with elastic deformation of the elastic deforming portion and ascends with restoration; and a bottom of a tray serving as a pressure receiving portion, which is provided on an ascending/descending path of the ascending/descending portion and comes in contact with the ascending/descending portion 79 descended to receive a part of the overload.

11 Claims, 8 Drawing Sheets

CONSOLE-SLIDING STRUCTURE

BACKGROUND OF THE INVENTION

1. Field of the Invention

This invention relates to a console-sliding structure for sliding the console attached to e.g. a vehicle.

2. Related Art

In the vehicle such as MPV (Multi Purpose Vehicle) or SUV (Sport Utility Vehicle) in recent years, the console arranged in the intermediate area in a vehicle-width direction has a tendency of being movable in a forward/backward moving direction (front-and-rear direction) of the vehicle.

As a structure for realizing the movement of the console, various structures have been proposed in which a rotating/sliding member such as a wheel or ball is provided below the console and this rotating/sliding member is arranged rollably in a rail. For example, Japanese Patent No. 3621599 and JP-A-2000-264132 disclose a sliding structure in which the rail is laid on a vehicle floor, a wheel is rotatably supported on the lower portion of the console by a supporting shaft and the wheel is rollably arranged in the rail. JP-A-2003-2123 and JP-A-2004-210006 disclose a sliding structure in which an upper rail is attached to the lower part of the console whereas a lower rail movably supporting the upper rail is attached to the vehicle floor, and a plurality of balls are arranged between the upper and lower rails.

In the above sliding structures, the load applied to the console is received by the rotary sliding member (wheel, ball), a rail, etc. which are constituent components of the sliding structure. By rolling the rotary sliding member, the console is slid along the rail so that its position in the front-and-rear direction can be changed. Thus, both the passenger sitting on a front seat (driver's seat, navigator's seat) and passenger sitting on a rear seat can use the console.

Further, in the above sliding structures, in order to assure that the console can operate without a hitch even when it is slid in a state where a high load is applied, for example, a man gets on the console or a heavy object equivalent to an occupant is placed thereon, as the respective constituent components, the materials with high rigidity are adopted.

Particularly, in many cases, actually, a sliding rail for the seat is employed as the rail for the console. This is based on the idea that since the sliding rail for the seat is used in a severer condition than the console, it can be used as the rail for the console with no problem.

However, in the above console, unlike the seat for a vehicle, it is necessary to slide the console in a state where a high load is applied because an occupant gets on the console or a heavy object equivalent to an occupant is placed thereon. In this sense, the conventional console sliding structures have a problem that they give an excessive quality in rigidity and increase weight and cost. Particularly, the rail is lengthened with an increase in the moving distance of the consol so that a problem of weight increase is conspicuous.

SUMMARY OF THE INVENTION

This invention has been accomplished under such circumstances. An object of this invention is to provide a console sliding structure which can use constituent components with low rigidity and can reduce weight and cost.

In order to attain the above object, the first aspect of the invention provides a console-sliding structure for slidably supporting a sliding member connected to a console by a rail, comprising: an elastic deforming portion which is elastically deformed when an overload is vertically applied to the console and is restored to its original state when the application of the overload ceases; an ascending/descending portion which descends with elastic deformation of the elastic deforming portion and ascends with restoration thereof; and a pressure receiving portion which is provided on an ascending/descending path of the ascending/descending portion and comes in contact with the ascending/descending portion descended to receive a part of the overload.

In accordance with the above configuration, the load vertically applied to the console is transmitted to the rail through the sliding member and also transmitted to the elastic deforming portion. When the elastic deforming portion is elastically deformed owing to the load, correspondingly, the ascending/descending portion ascends or descends.

If the load greater than under normal conditions (overload) is not vertically applied to the console, the amount of elastic deformation in the elastic deforming portion is small (inclusive of zero) and so the ascending/descending portion leaves the pressure receiving portion. Thus, by slide-moving the sliding member along the rail, the console can be moved in the direction along the rail.

On the other hand, if the overload is vertically applied to the console, for example, an occupant gets on the console or a heavy object equivalent to the man is placed thereon, the elastic deforming portion is elastically deformed. Owing to the elastic deformation, when the elastic deforming portion descends to come in contact with the pressure receiving portion, a part of the above overload is received by the pressure receiving portion. Thus, the load applied to the sliding member itself, supporting shaft supporting the sliding member to the console or the area of the rail in contact with the sliding member is reduced. Accordingly, as compared with the case where the function of receiving the overload by the pressure receiving portion is not given, the material having a low rigidity can be employed as the constituent members of the sliding structure. As a result, the weight and cost of the sliding structure can be reduced.

Incidentally, as the second aspect of the invention, the sliding member may be formed of a wheel rollably arranged in the rail. In this case, since the wheel rolls, the contact area of the wheel with the rail is changed and the sliding member slide-moves along the rail. At this time, friction due to the contact between the wheel and the rail is small.

The third aspect of the invention provides a console-sliding structure according to the first and second aspect of the invention, wherein the sliding member is connected to the console through a retainer; and the elastic deforming portion is provided in the retainer as a part of the retainer and formed of a flat spring elastically deformable in a vertical direction.

In accordance with the above configuration, the load vertically applied to the console is transmitted to the rail through the retainer and sliding member and transmitted to the elastic transforming portion of the flat spring. When the flat spring is elastically deformed in the vertical direction by this load, the ascending/descending portion correspondingly ascends/descends.

If the overload is not applied to the console, the amount of elastic deformation of the flat spring is small (inclusive of zero) and so the ascending/descending portion leaves the pressure receiving portion. On the other hand, when the overload is applied to the console, the flat spring is elastically deformed in the vertical direction. Owing to the elastic deformation, when the ascending/descending portion descends to come in contact with the pressure receiving portion, a part of the overload is received by the pressure receiving portion.

Now, the above flat spring is formed in the retainer as a part of the retainer. Therefore, the elastic deforming portion is simultaneously manufactured during the process of manufacturing the retainer. As compared with the case where the elastic deforming portion is manufactured separately from the retainer and fixed, the retainer and elastic deforming portion can be easily manufactured in a smaller number of steps.

The fourth aspect of the invention provides a console-sliding structure according to the third aspect of the invention, wherein the flat spring is extended in a direction along the rail from a body of the retainer, and the sliding member is provided at the tip of the flat spring.

In accordance with the above configuration, when an overload is vertically applied to the console, the overload is transmitted from the body of the retainer to the rail through the elastic deforming portion and sliding member. In the process of transmission, the flat spring is elastically deformed in the vertical direction.

Now, in the retainer, the flat spring extends in the direction along the rail. For this reason, while assuring the amount of elastic deformation, the flat spring can be formed in a shape having a narrow width in the direction orthogonal to the rail. Thus, the sliding structure can be made compact in the direction orthogonal to the rail.

The fifth aspect of the invention provides a console-sliding structure according to the fourth aspect of the invention, wherein the flat spring is formed as one of its pair on the retainer; and the pair of flat springs are extended in the directions along the rail from the body of the retainer and opposite to each other.

In accordance with the above configuration, if an overload is vertically applied to the console, the overload is transmitted from the body of the retainer to the rail through the pair of flat springs and a pair of sliding members. During the process of transmission, both flat springs are elastically deformed in the vertical direction.

Now, although both flat springs extend in the directions along the rail, these directions are opposite to each other with respect to the base of the body of the retainer. So, the flat springs are elastically deformed on both sides of the body in the direction along the rail. Thus, the overload is transmitted to both sliding members and rail in good balance.

The sixth aspect of the invention provides a console-sliding structure according to the second aspect of the invention, wherein the wheel is supported to the retainer connected to the console by a supporting shaft; and the elastic deforming portion is formed of an elastic member formed on the entire periphery of the wheel.

In accordance with the above configuration, the load vertically applied to the console is transmitted to the rail through the retainer, supporting shaft, wheel and elastic member.

If the overload is not applied to the console, the amount of elastic deformation in the vertical direction of the elastic member is small (inclusive of zero) and so the ascending/descending portion leaves the pressure receiving portion. Therefore, by rolling the wheel and elastic member on the rail, the console can be moved in the direction along the rail.

On the other hand, if the overload is vertically applied to the console, the elastic member is elastically deformed in the vertical direction. Correspondingly, the wheel and ascending/descending portion descend. When the ascending/descending portion comes in contact with the pressure receiving portion, a part of the overload is received by the pressure receiving portion. Thus, the load applied to the wheel itself, supporting shaft supporting the wheel to the console or the area of the rail in contact with the elastic member is reduced.

The seventh aspect of the invention provides a console-sliding structure according to the third aspect of the invention, wherein the ascending/descending portion is formed as a part of the retainer.

In accordance with the above configuration, the ascending/descending portion is manufactured in the retainer as a part of the retainer. Therefore, the ascending/descending portion is also simultaneously formed during the process of manufacturing the retainer. Thus, as compared with the case where the ascending/descending portion is manufactured separately from the retainer and fixed, the retainer and ascending/descending portion can be easily manufactured in a smaller number of steps.

The eighth aspect of the invention provides a console-sliding structure according to the first aspect of the invention, wherein the rail is provided with a groove having an opening on its side; and the sliding member is arranged in the groove and supported to the console by a supporting segment intruding into the groove through the opening.

In accordance with the above configuration, by sliding the sliding member arranged in the groove along the groove, the console is moved along the direction along the rail. In this case, the supporting segment moves along the opening of the groove.

Now, since the groove of the rail has the opening, an alien substance such as garbage or dust may intrude into the groove through the opening. In view of this, the eight aspect of the invention adopts the structure in which the groove has the opening on the side as described above. Thus, as compared with the case where the groove has the opening on the upper face, the alien substance is not prone to intrude into the groove through the opening.

The ninth aspect of the invention provides a console-sliding structure according to the first aspect of the invention, wherein the pressure receiving portion has a planar pressure-receiving plane; and the ascending/descending portion has a contact segment which is formed substantially in parallel to the pressure-receiving plane and comes in plane-contact with the pressure receiving plane with descent of the ascending/descending portion.

In accordance with the above configuration, as a result that an overload is applied to the movable console, when the elastic deforming portion is elastically deformed and the ascending/descending portion descends, at the contact segment nearly in parallel to the planar pressure receiving plane of the pressure receiving portion the ascending/descending portion comes in plane-contact with the planar pressure receiving plane. Thus, the load is transmitted to the pressure receiving portion over a wide area. As a result, the load applied to the pressure receiving plane per unit area is reduced so that the pressure receiving portion having a low rigidity can be employed. This is advantageous in order to reduce the weight and cost.

As the tenth aspect of the invention, the rail may be laid between seats adjacent to each other in a vehicle width direction so as to extend in a traveling direction of the vehicle. By slide-moving the console along the rail, the position of the vehicle traveling direction of the console can be changed between the seats adjacent to each other in the vehicle-width direction so that the range of employment of the console in the traveling direction expands.

The eleventh aspect of the invention provides a console-sliding structure according to the tenth aspect of the invention, wherein the pressure receiving portion is formed of a floor of the vehicle, or a member placed on the floor.

In accordance with the above configuration, using the floor of the vehicle which is essentially high in rigidity, the floor is directly used as the pressure receiving portion. Otherwise, by using the member placed on the floor as the pressure receiving portion, a part of the overload can be surely received. As a result, it is not necessary to separately provide the pressure receiving portion which is high in rigidity.

In accordance with the console-sliding structure according to this invention, constituent components with low rigidity can be used and the weight and cost can be reduced.

DETAILED DESCRIPTION OF THE PREFERRED EMBODIMENTS

Embodiment 1

Now referring to FIGS. 1 to 7, an explanation will be given of the first embodiment in which this invention is embodied in a center console installed on a floor of the vehicle such as MPV and SUV. The following explanation will be made under the consumption that the direction of moving a vehicle forward is front and the direction of moving it backward is rear.

Figure 1:
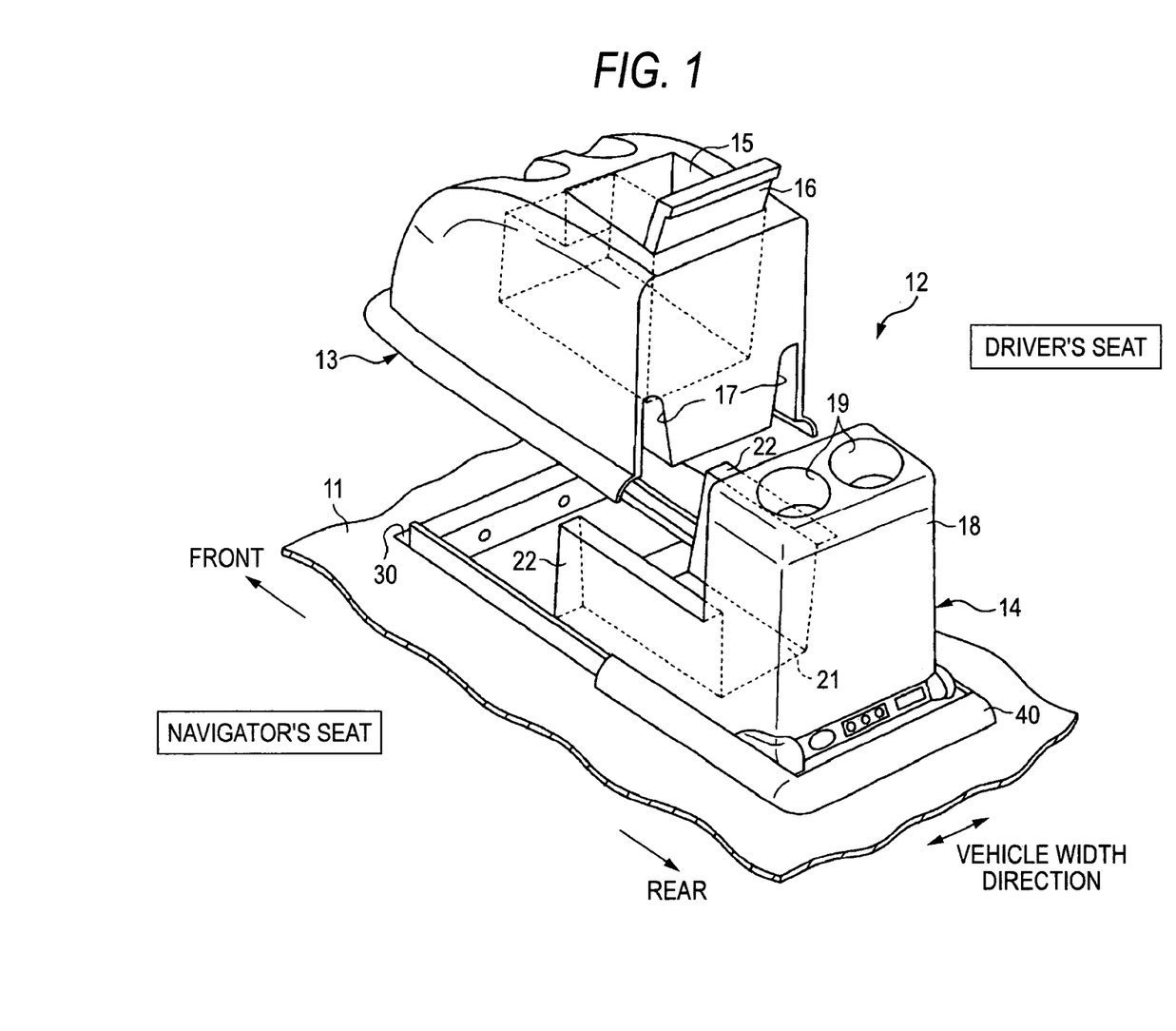
FIG. 1 is a partial perspective view showing the schematic configuration of a fixed console, a movable console, etc. in the first embodiment embodying this invention.

FIG. 1 shows a schematic configuration of a center console 12 in the intermediate area in a vehicle width direction in the front of a floor 11 of the vehicle. The center console 12 includes a fixed console 13 immovably attached to the floor 11 and a movable console 14 which is arranged behind the fixed console 13 and can slide-move in the front-and-rear direction to approach or leave the fixed console 13. It should be noted that FIG. 1 shows the state before the fixed console 13 is attached to the floor 11. The fixed console 13 includes a concave 15 for a globe compartment whose upper face can be opened and a cover 16 for opening/closing the opening of the concave 15. On both sides in the vehicle width direction of the fixed console 13, a pair of guide grooves 17 which are opened in the lower and rear faces of the fixed console 13 are provided.

The movable console 14 includes a body 18 having a height approximately equal to that of the fixed console 13. The body 18 has cup holders each formed of a cylindrical concave 19 opened in the upper face. Further, the movable console 14 includes a bottom 21 extending forward from the lower part of the body 18 and a pair of low side walls 22 provided on both sides in the vehicle width direction of the bottom 21. Each side wall 22 is designed so that at least a portion thereof always intrudes in the corresponding guide groove 17 regardless of the fore-and-aft position of the movable console 14. Therefore, in the state where the body 18 has left the fixed console 13 backward by the sliding movement of the movable console 14, a space surrounded by the body 18, fixed console 13, bottom 21 and both side walls 22 is temporarily generated. This space can be used as the globe compartment.

As a structure for realizing the sliding movement of the above movable console 14, the following sliding structure is adopted.

Figure 2:
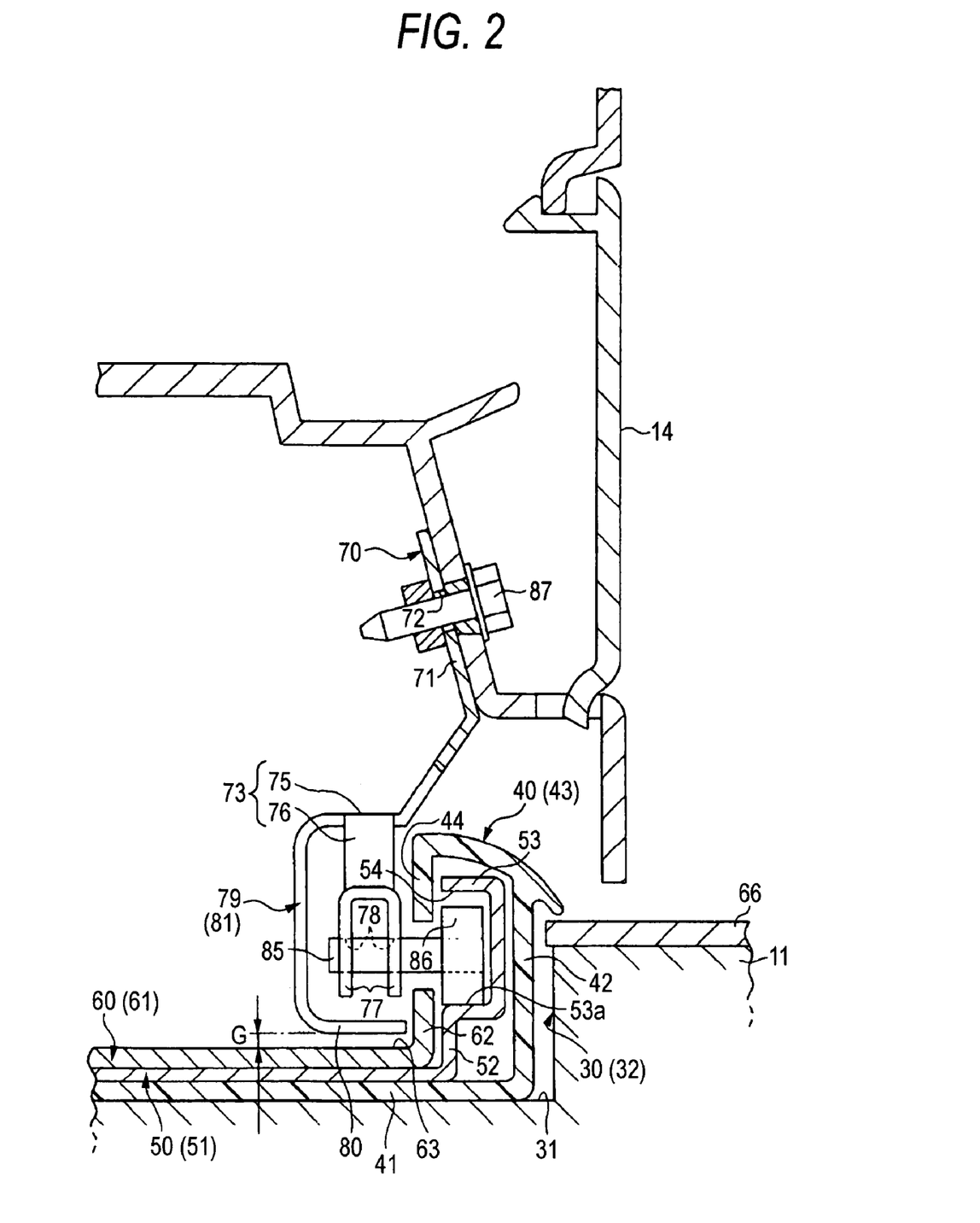
FIG. 2 is a partial longitudinal sectional view showing the state when an overload is not vertically applied to a console in the sliding structure according to the first embodiment.
Figure 5:
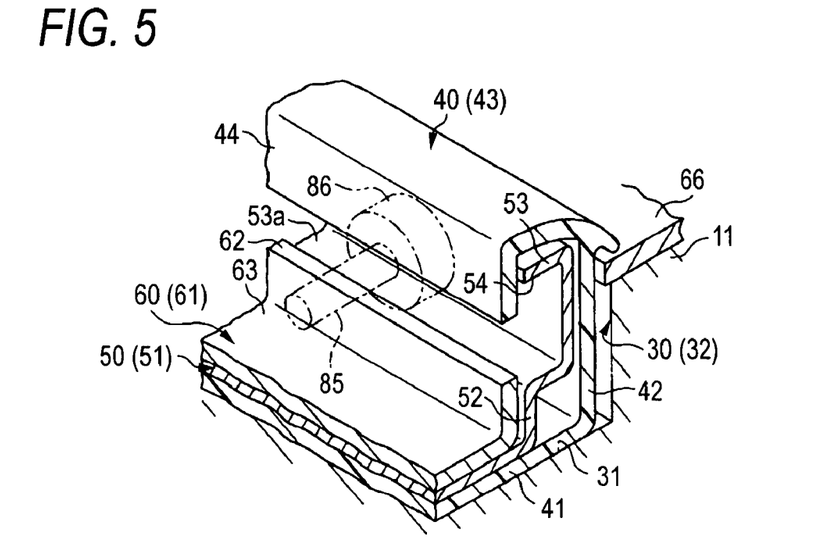
FIG. 5 is a partial perspective view showing a rail and its peripheral area in the sliding structure shown in FIG. 2.

As seen from FIGS. 2 and 5, at the front of the vehicle floor 11, a concave 30 is formed in the intermediate area in the vehicle-width direction. At least the front of the concave 30 is located between the driver's seat and the navigator's seat in the front-and-rear direction of the vehicle (see FIG. 1). The rear of the concave 30 is located on the side of the rear seat farther than the driver's seat and navigator's seat. It should be noted that FIGS. 2 and 5 illustrate only the one side (right side) in the vehicle width direction of the concave 30. The other side (left side), which is the same as the above one side, will not be explained here.

On the inner bottom face 31 of the concave 30, a cover 40, a rail 50 and a tray 60 are successively placed. These cover 40, rail 50 and tray 60 correspond to "a structure placed on the floor" in the claims. The cover 40 is mainly employed in order to cover a groove 53 (described later) of the rail 50. The cover 40 includes a bottom 41 placed on the inner bottom 31 of the concave 30, an outer wall 42 extending upward along the inner wall 32 of the concave 30 from both sides in the vehicle width direction of the bottom 41, a shade 43 provided at the upper end of the outer wall 42 and curving so as to project upward, and an inner wall 44 projecting downward from the one side (left end in FIG. 2) of the umbrella 43. The inner wall 44 is located apart, by a predetermined distance in the vehicle width direction, from the outer wall 42.

The rail 50 includes a base 51 placed on the bottom 41, a pair of low side walls 52 provided on both sides in the vehicle width direction of the base 51 and grooves 53 provided on the upper side of the side walls 52, respectively. Each groove 53 has an opening 54 on its side. Now, the side refers to the side facing the opposite grooves 53 (left side in FIGS. 2 and 5). The grooves 53 are arranged in the space sandwiched by the outer wall 42 and inner wall 44 of the cover 40.

The tray 60 is placed on the base 51 of the rail 50. The tray 60 includes a bottom 61 which is sheet-like and occupies a greater part of the tray 60, and a pair of flexed segments 62 provided on both sides in the vehicle width direction of the bottom 61. Each flexed segment 62 is located at a position below and apart by a predetermined distance from the inner wall 44 of the cover 40. The bottom 61 of the tray 60 serves as a pressure receiving portion in the sliding structure. Specifically, the bottom 61 is located below an ascending/descending portion 79 on an ascending/descending path described later and brought into contact with the ascending/descending portion 79 having descended to receive a part of an overload from below. The area on the upper face of the bottom 61 corresponding to the lower part of the ascending/descending portion 79 serves as a planar pressure-receiving plane 63.

Incidentally, reference numeral 66 in FIGS. 2 and 5 denotes a carpet arranged in the area exclusive of the concave 30 on the floor 11.

Figure 3:
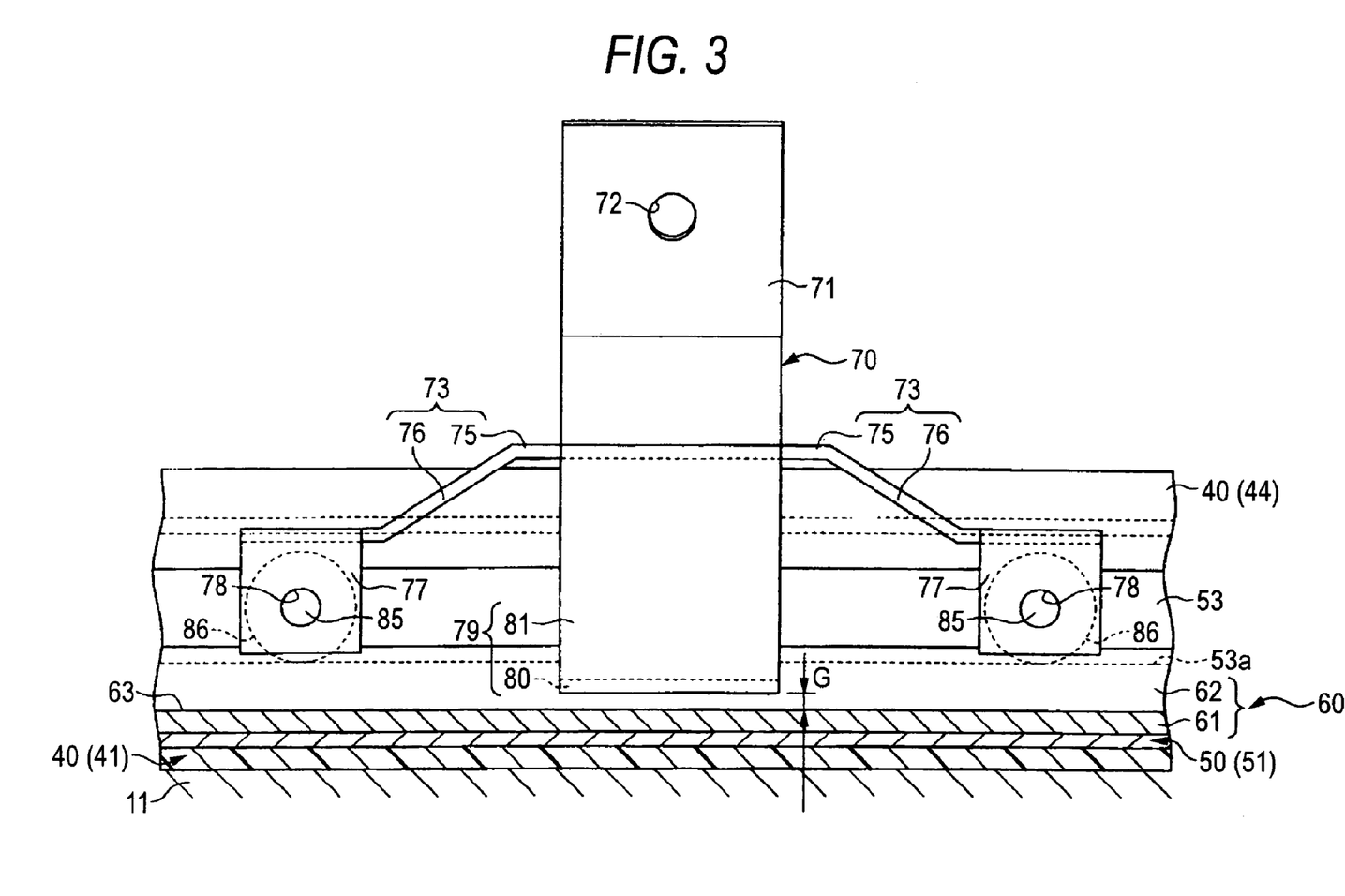
FIG. 3 is a partial longitudinal sectional view showing the state when the sliding structure shown in FIG. 2 is seen from the left side of this figure.
Figure 4:
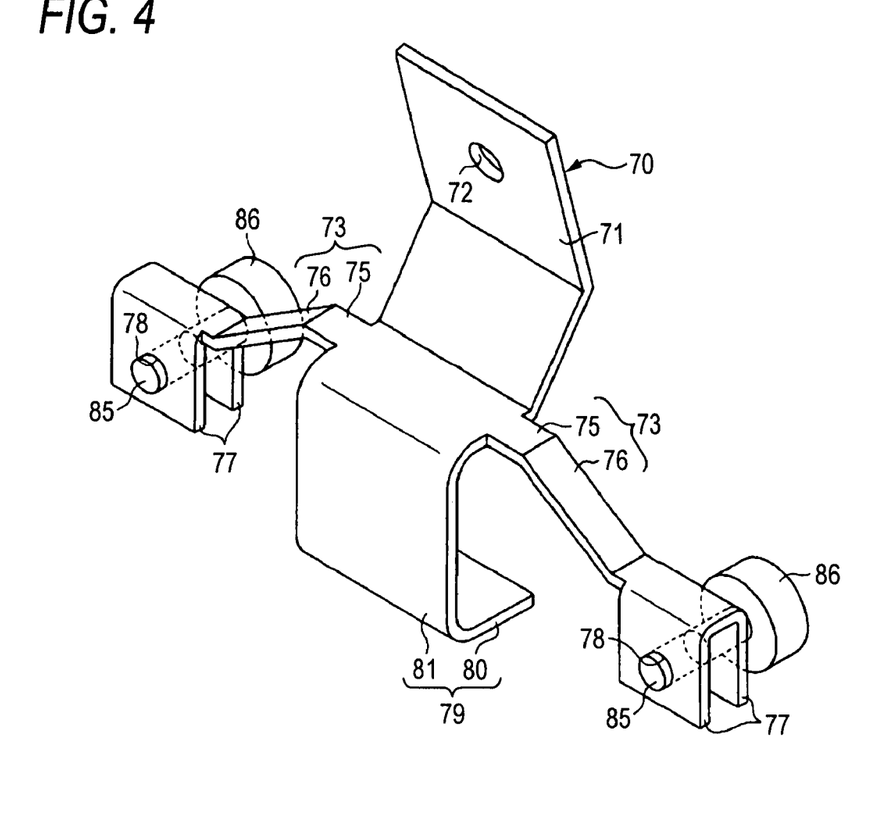
FIG. 4 is a perspective view showing the positional relationship among a retainer, supporting shafts and wheels in the sliding structure shown in FIG. 2.

On the other hand, at a plurality of positions of the lower part of the movable console 14, for example, at four corners of the bottom, as seen from at least one of FIGS. 2 to 4, retainers 70 are provided. Each retainer 70 is formed by machining a metallic plate, and includes a wide body 71 being a basic skeleton and a pair of elastic deforming portions 73 and a single ascending/descending portion 79 which are integrally formed to the body 71. A through-hole 72 is made in the body 71, and by a clip 87 (see FIG. 2) passed through the through-hole 72, the retainer 70 is fastened to the lower part of the movable console 14.

Both elastic deforming portions 73 are formed of a pair of flat springs which are elastically deformed when an overload is vertically applied to the movable console 14 and are restored to their original state when its application ceases. Now, the overload is assumed as the load applied when an occupant gets on the movable console 14 or a heavy object equivalent to the man is placed thereon. This overload is greatly different from the load applied to the movable console 14 when a drinking vessel such as a cup, can or pet-bottle is held in a standing state by the cup holder (concave 19), or small articles are placed on the bottom 21.

The respective flat springs extend in the front-and-rear directions along the groove 53 of the rail 50 from the lower end of the body 71 of the retainer 70 and opposite to each other. Each flat spring includes a horizontal segment 75 on the side near the body 71 and a slope segment 76 on the side farther from the body 71. Each horizontal segment 75 nearly horizontally extends forward or backward of the vehicle from the body 71. Each slope segment 76 slopes at a predetermined angle from the horizontal segment 75 so that it becomes lower as it leaves the body 71. Thus, each flat spring bends at a boundary between each horizontal segment 75 and each slope segment 76.

At the lower end of each slope segment 76 which is a tip of each flat spring, a pair of supporting pieces 77 separated from each other in the vehicle width direction are formed. In both supporting pieces 77, supporting holes 78 are made in the same axial line extending in the vehicle width direction, respectively. A supporting shaft 85 is passed through the supporting hole 78 and secured so that it cannot come off. The supporting shaft 85 passes between the inner wall 44 of the cover 40 and the flexed segment 62 of the tray 60 in a non-contact state and intrudes into the groove 53 through the opening 54. On each supporting shaft 85, a wheel 86 made of metal is rotatably supported by a bearing (not shown). These wheels 86 are used as sliding members. The supporting shaft 85 serves as a supporting portion which rotatably supports the wheel 86 located in the groove 53 on the movable console 14 located outside the groove 53.

The ascending/descending portion 79 includes a contact segment 80 arranged apart by a predetermined gap G (see FIGS. 2 and 3) upward from the pressure receiving plane 63 of the bottom 61 of the tray 60 and a coupling segment 81 which vertically extends to couple the body 71 and the contact segment 80 to each other. The contact segment 80 is formed nearly in parallel to the pressure receiving plane 63 and comes in plane-contact with the pressure receiving plane 63 with descent of the ascending/descending portion 79. The gap G is set to be smaller than the maximum amount of elastic deformation in the vertical direction of the elastic deforming portion 73. The maximum amount of elastic deformation is the maximum value of the amount of elastic deformation by which the elastic deforming portion 73 is restored to its original state.

In the manner described above, the sliding structure of the movable console 14 according to the first embodiment is designed. The load having various magnitudes is vertically applied to the movable console 14, and is transmitted to the groove 53 of the rail 50 through the retainer 70, supporting shaft 85, bearing and wheel 86. When the elastic deforming portions 73 of the retainer 70 are elastically deformed in the vertical direction by the load, the ascending/descending portion 79 correspondingly ascends or descends.

The above sliding structure operates in different manners according to the cases where the overload is applied to the movable console 14, for example, an occupant gets on the movable console 14 or a heavy object equivalent to the man is placed thereon, and is not applied.

<Case Where an Overload is not Applied>

In this case, as seen from at least one of FIGS. 2 and 3, the amount of elastic deformation in the vertical direction of the elastic deforming portions 73 is small (inclusive of zero) and so the contact segment 80 of the ascending/descending portion 79 leaves upward the pressure receiving plane 63. The ascending/descending portion 79 does not slide on the pressure receiving plane 63 so that friction due to the sliding is not generated. Further, the friction generated between the wheel 86 and the inner bottom 53a of the groove 53 is small.

Thus, when force in the front-and-rear direction is applied to the movable console 14, this force is transmitted to the wheels 86 through the retainer 70, bearings and supporting shafts 85. So, even if the force is small, each wheel 86 rolls on the inner bottom 53a of the groove 53. Since the load is small, the amount of elastic deformation of the elastic deforming portions 73 during rolling is small. Owing to the above rolling, the contact areas between the wheels 86 and the groove 53 change so that movable console 14 moves in the direction along the groove 53. Owing to this movement, both elastic deforming portions 73 formed in the retainer 70 also move in the same direction, and the ascending/descending portion 79 in a state separated upward from the pressure receiving plane 63 also moves in the same direction. Further, the supporting shaft 85 supporting the wheel 86 in a state separated from the inner wall 44 of the cover 40 and flexed segment 62 of the tray 60 moves along the opening 54 of the groove 53.

As described above, by slide-moving the movable console 14 along the groove 53, between the seats adjacent in the vehicle width direction, the position of the movable console 14 in the front-and-rear direction of the vehicle can be changed so that the range of employment of the movable console 14 expands.

<Case Where an Overload is Applied>

Figure 6:
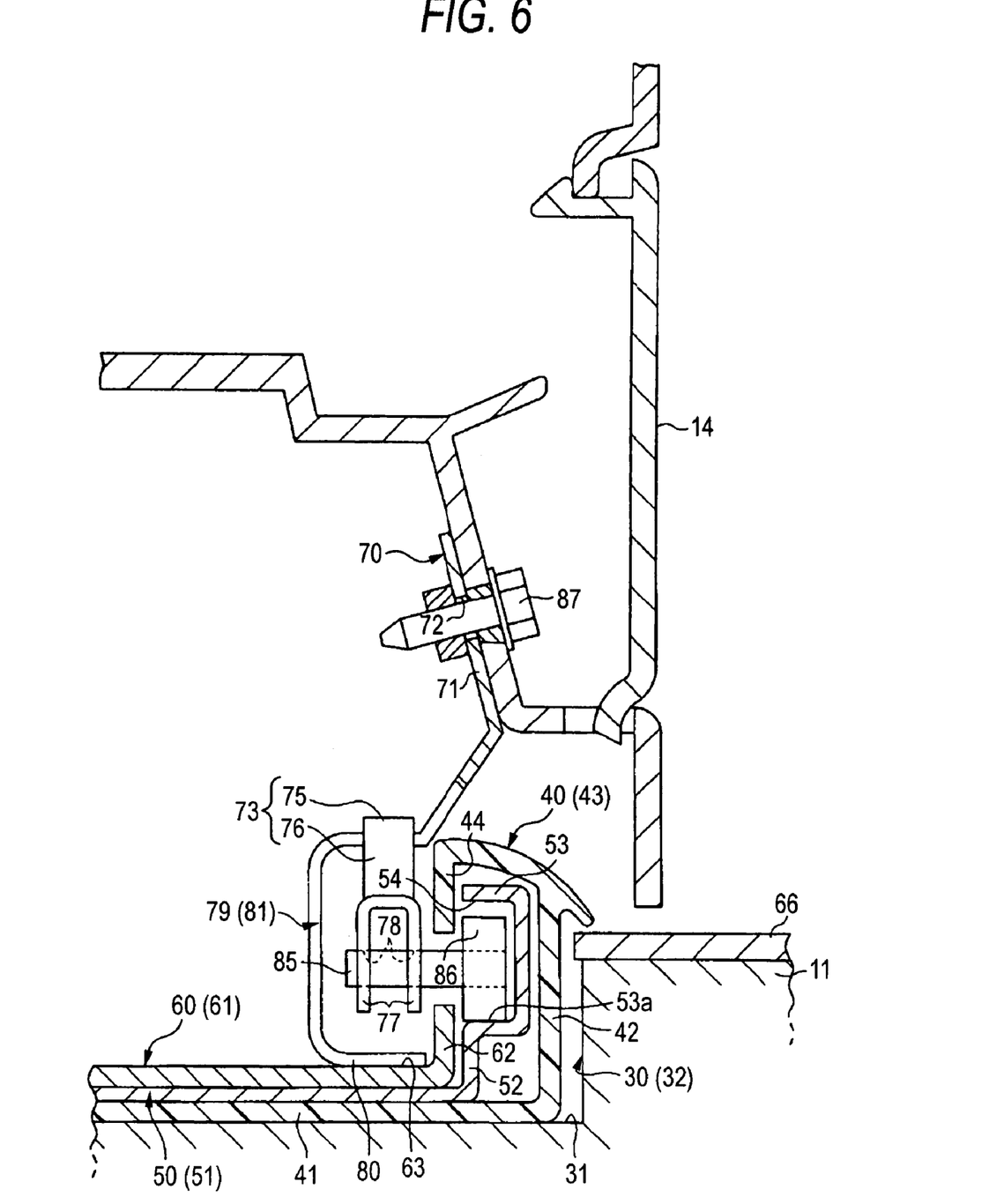
FIG. 6 is a view corresponding to FIG. 2, which is a partial longitudinal sectional view showing the state of the sliding structure when an overload is vertically applied to a movable console.
Figure 7:
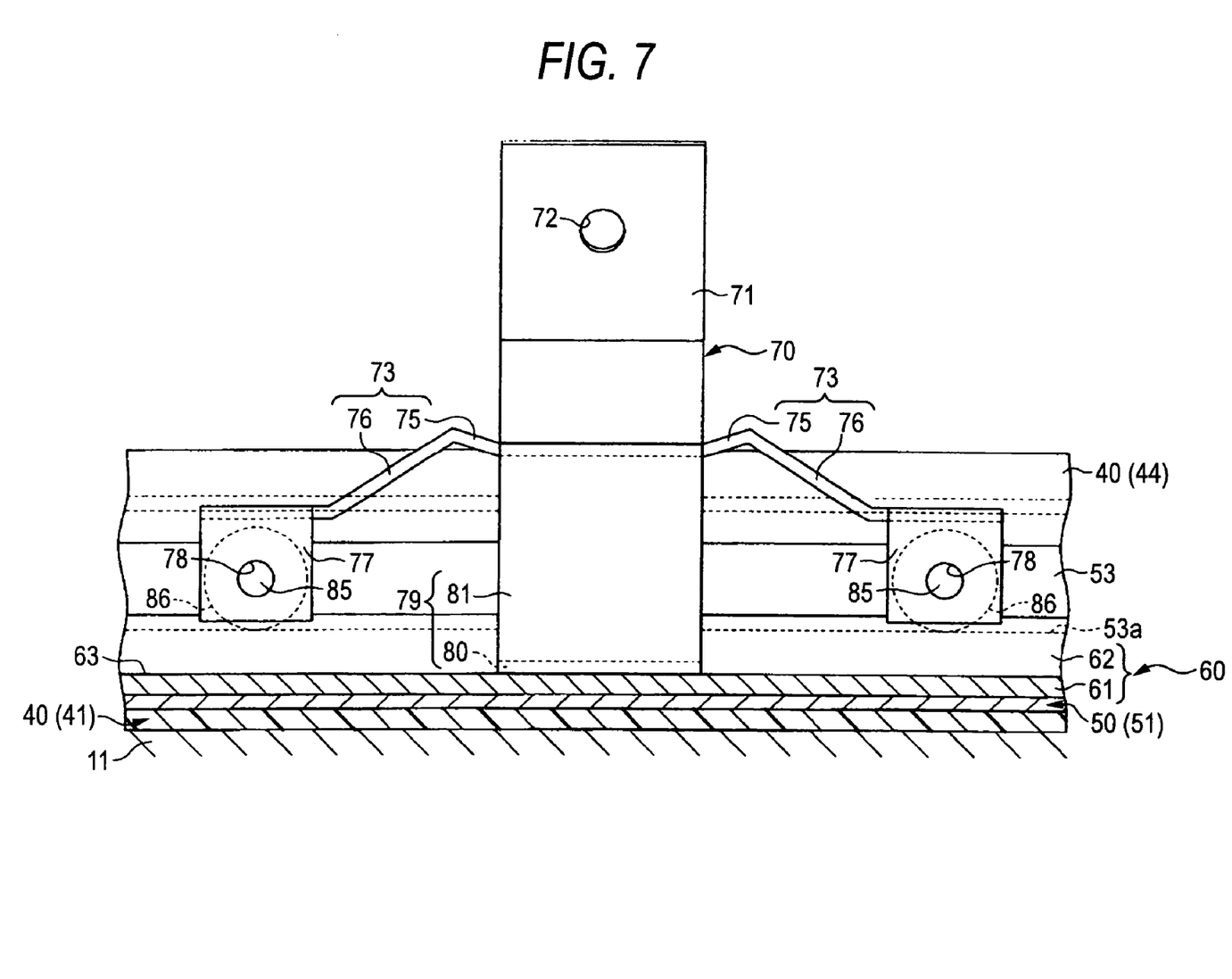
FIG. 7 is a view corresponding to FIG. 3, which is a partial longitudinal sectional view showing the state of the sliding structure when an overload is vertically applied to a movable console.

In this case, as seen from at least one of FIGS. 6 and 7, the overload is transmitted from the body 71 of the retainer 70 to the groove 53 of the rail 50 through the pair of elastic deforming portions 73, both supporting pieces 77, supporting shafts 85, bearings and wheels 86. In the process of transmission, the elastic deforming portions 73 are elastically deformed in the vertical direction. More specifically, the elastic deforming portion 73 is elastically deformed so that the boundary between the horizontal segment 75 and the slope segment 76 gets sharp upwards (see FIG. 7).

Now, although both elastic deforming portions 73 extend in the directions along the groove 53 of the rail 50 (front-and-rear direction), these directions are opposite to each other with respect to the base of the body 71 of the retainer 70. So, the elastic deforming portions 73 are elastically deformed on both front and rear sides of the body 71 in the direction along the groove 53. Thus, the overload is transmitted to both wheels 86 and groove 53 in good balance.

Owing to the elastic deformation of the elastic deforming portions 73, when the ascending/descending portion 79 descends to come in contact with the bottom of the tray 60 and the gap G becomes zero, a part of the overload is indirectly transmitted to the floor 11 of the vehicle through the tray 60, rail 50 and cover 40. This floor 11 is essentially high in rigidity. Thus, a part of the overload is surely received by the floor 11 through the tray 60, rail 50 and cover 40. As a result, the load applied to the wheels 86 themselves, supporting shafts 85 supporting the wheels 86 to the movable console 14 or the groove 53 of the rail 50 in contact with wheels 86 is reduced.

At the time of the above contact, the contact segment 80 of the ascending/descending portion 79 which is nearly in parallel to the pressure receiving plane 63 comes in plane-contact with the planar pressure receiving plane 63 of the tray 60. Therefore, the overload is transmitted to the bottom 61 of the tray 60 over a wide area. Thus, the load applied to the pressure receiving plane 63 per unit area is reduced.

When application of an overload to the movable console 14 ceases, for example, the man got on the movable console 14 gets down or the heavy object placed on the movable console 14 is shifted to another place, both elastic deforming portions 73 of the retainer 70 try to return to their original state owing to the elastic restoring force of themselves. Correspondingly, the ascending/descending portion 79 ascends to leave upward the bottom 61 of the tray 60. In this way, the sliding structure returns to the state of FIGS. 2 and 3 described above.

In accordance with the first embodiment described above in detail, the following advantages can be obtained.

(1) As a sliding structure for the movable console 14, adopted is the configuration including the elastic deforming portions 73, ascending/descending portion 79 and bottom 61 (pressure receiving portion) of the tray 60. For this reason, when an overload is not applied to the movable console 14, in a state where the ascending/descending portion 79 has been separated upward from the bottom 61, each wheel 86 can be rolled on the groove 53 of the rail 50. Thus, the movable console 14 can be moved in the direction (front-and-rear direction) along the groove 53.

On the other hand, when the overload is applied to the movable console 14, the ascending/descending portion 79 descended owing to the elastic deformation of the elastic deforming portions 73 is caused to come in contact with the bottom 61 so that a part of the overload is received by the bottom 61. Thus, the load applied to the wheels 86, supporting shafts 85, groove 53, etc can be reduced. For this reason, as compared with the case where there is not the configuration for receiving a part of the overload as a constituent member of the sliding structure (corresponding to the prior arts), the member having low rigidity can be employed and so the weight and cost of the sliding structure can be reduced.

(2) A part of the retainer 70 is formed of flat springs which are used as the elastic deforming portions 73. For this reason, in the process of manufacturing the retainer 70, the elastic deforming portions 73 can be also simultaneously manufactured. Thus, as compared with the case where the elastic deforming portions 73 are formed separately from the retainer 70 and fixed, the retainer 70 and elastic deforming portions 73 can be manufactured in a smaller number of steps.

(3) The flat spring is formed in a shape extending in the direction (front-and-rear direction) along the groove 53 of the rail 50 from the body 71 of the retainer 70. For this reason, while assuring the amount of elastic deformation, the flat spring can be formed in a shape having a narrow width in the direction (vehicle width direction) orthogonal to the groove 53. Thus, the sliding structure can be made compact in the direction orthogonal to the groove 53.

(4) Both flat springs are formed as a pair in the retainer 70. Particularly, both flat springs are formed as a shape extending in the directions (front-and-rear direction) along the groove 53 of the rail 50 from the body 71 of the retainer 70 and opposite to each other. Thus, the elastic deforming portions 73 are elastically deformed on both front and rear sides of the body 71 in the direction along the groove 53 so that the overload is transmitted to both wheels 86 and groove 53 in good balance.

(5) The ascending/descending portion 79 is formed as a part of the retainer 70. Therefore, in the process of manufacturing the retainer 70, the ascending/descending portion 79 can be also simultaneously formed. Thus, as compared with the case where the ascending/descending portion 79 is manufactured and fixed separately from the retainer 70, the retainer 70 and ascending/descending portion 79 can be manufactured in a smaller number of steps.

(6) Since the groove 53 of the rail 50 has the opening 54, an alien substance such as garbage or dust may intrude into the groove 53 through the opening 54. In view of this, the first embodiment adopts the structure in which the groove 53 has the opening 54 on the side. Thus, as compared with the case where the groove 53 has the opening on the upper face, the phenomenon that the alien substance intrudes into the groove 53 through the opening 54 can be suppressed.

(7) The pressure receiving plane 63 of the bottom 61 (pressure receiving portion) is formed in a planar shape. Further, the ascending/descending portion 79 has the contact segment 80 nearly in parallel to the pressure receiving plane 63. Therefore, when the overload is applied to the movable console 14, at the contact segment 80, the ascending/descending portion 79 can be brought into plane-contact with the planar pressure receiving plane 63. Thus, the overload is transmitted to the bottom 61 (pressure receiving portion) over a wide area so that the load applied to the pressure receiving plane 63 per unit area is reduced. From this point of view, the rail 50 which is low in rigidity can be used, which is advantageous in order to reduce the weight and cost of the sliding structure.

(8) The sliding direction of the movable console 14 depends on the direction in which the groove 53 of the rail 50 extends. The rail 50 is laid so as to extend in the front-and-rear direction between the seats adjacent to each other in the vehicle width direction on the floor 11 of the vehicle. For this reason, by slide-moving the movable console 14 along the groove 53, between the seats adjacent in the vehicle width direction, the position of the movable console 14 in the front-and-rear direction of the vehicle is changed so that the range of employment of the movable console 14 expands in the front-and-rear direction. Not only the man sitting on the front seats (driver's seat and navigator's seat) but also the man sitting on the rear seat can grasp the movable console 14 and so can put small articles or hold the drinking vessel in a standing state. Thus, as compared with the case where the movable console 14 is not slid, the convenience can be improved.

(9) On the floor 11 of the vehicle which is essentially high in rigidity, the cover 40, rail 50 and tray 60 are successively placed. In addition, the bottom 61 of the tray 60 arranged at the uppermost position is employed as the pressure receiving portion. For this reason, a part of the overload applied on the movable console 14 can be indirectly but surely received by the floor 11 with high rigidity. Thus, since the overload is surely received, it is not necessary to separately provide the pressure portion with high rigidity.

Embodiment 2

Next, an explanation will be given of the second embodiment in which this invention is embodied, mainly, of a difference from the first embodiment.

Figure 8:
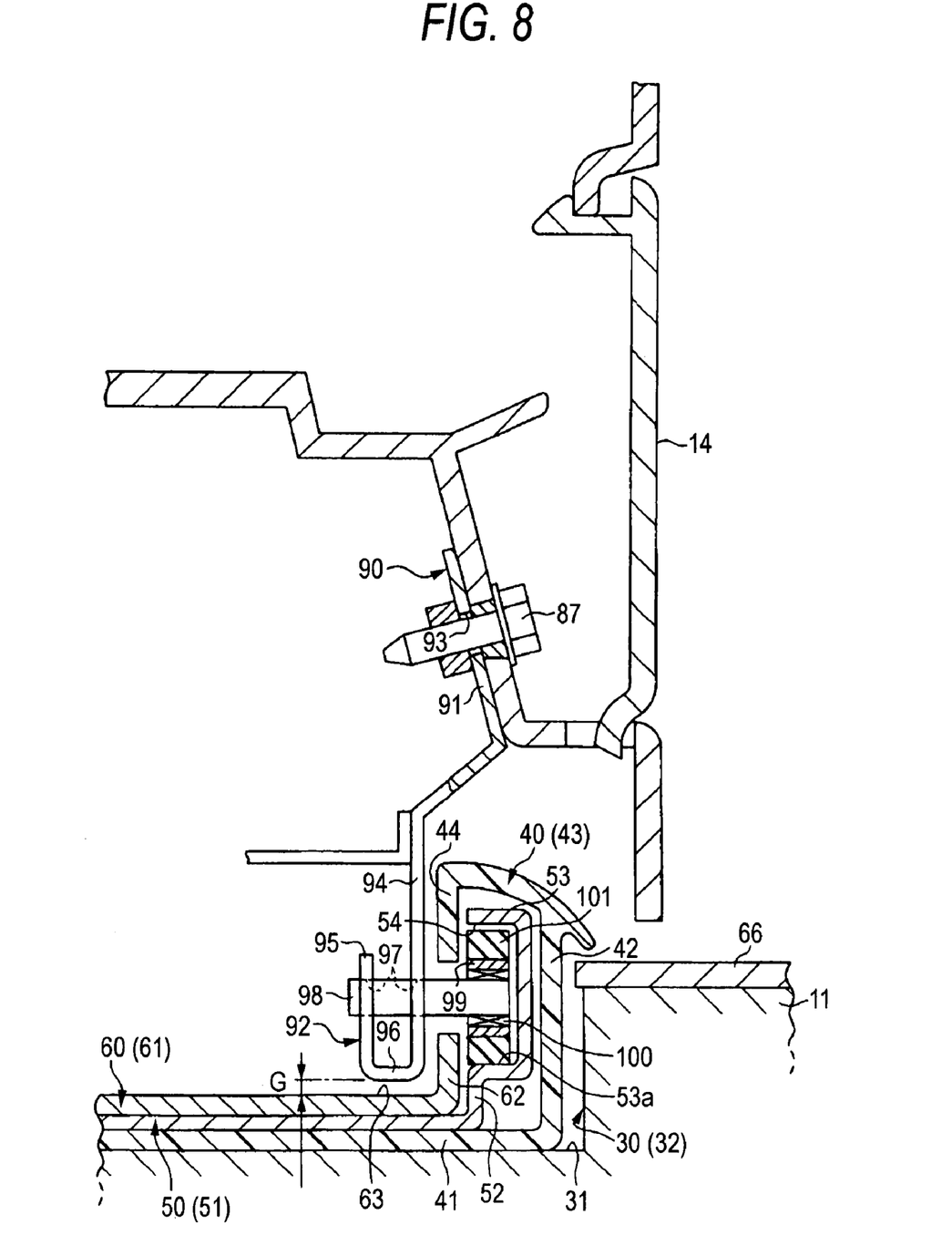
FIG. 8 is a view showing the second embodiment corresponding to FIG. 2, which is a partial longitudinal sectional view showing the state of the sliding structure when an overload is not vertically applied to a movable console.

As seen from FIG. 8, at a plurality of positions of the lower part of the movable console 14, retainers 90 are provided. Each retainer 90 is formed by machining a metallic plate, and consists of an attaching portion 91 constituting an upper part and an ascending/descending portion 92 constituting a lower part. A through-hole 93 is made at the upper position of the attaching portion 91. Using a clip 87 passed through the through-hole 93, the retainer 90 is fastened to the lower part of the movable console 14.

The ascending/descending portion 92 includes a first supporting segment 94 which extends nearly vertically in the vicinity of the inner wall 44 of the cover 40 and the flexed segment 62 of the tray 60, a second supporting segment 95 which is arranged in parallel to the first supporting segment 94 and lower than the first supporting segment 94, and a contact segment 96 which couples the lower ends of the first and second supporting segments 94, 95. The ascending/descending portion 92 is formed in a nearly J-shape as a whole.

The contact segment 96 is arranged apart by a predetermined gap G upward from the pressure receiving plane 63 of the tray 60. The contact segment 96 is formed to be nearly in parallel to the pressure receiving plane 63. The contact segment 96 comes in plane-contact with the pressure receiving plane 63 with descent of the ascending/descending 92. The gap G is set to be smaller than the maximum amount of elastic deformation in the vertical direction of an elastic deforming portion 101 described later. The maximum amount of elastic deformation is the maximum value of the amount of elastic deformation by which the elastic deforming portion 101 is restored to its original state.

In both first and second supporting segments 94, 95, supporting holes 97 are made in the same axial line extending in the vehicle width direction. A supporting shaft 98 is passed through the supporting holes 97 and secured so that it cannot come off. A part of the supporting shaft 98 intrudes between the inner wall 44 and the flexed segment 62 and into the groove 53 through the opening 54. On the supporting shaft 98, a wheel 99 made of metal is rotatably supported by a bearing 100. The wheel 99 is used as a sliding member and arranged in the groove 53.

Further, on the entire periphery of the wheel 99, a cylindrical elastic deforming portion 101 of synthetic rubber, elastomer, etc. is provided. In the state where the wheel 99 is arranged within the groove 53, the elastic deforming portion 101 is kept in contact with the inner bottom 53a of the groove 53. The elastic deforming portion 101 carries out the same function as the elastic deforming portion 73 in the first embodiment. Namely, when an overload in the vertical direction is applied to the movable console 14, the elastic deforming portion 101 is also elastically deformed in the same direction, and when application of the overload ceases, it is restored to the original state. Now, it should be noted that the "overload" is used in the same sense as that in the first embodiment. Incidentally, when the overload is not applied to the movable console 14, the elastic deforming portion 101 will not be elastically deformed. Even if it is elastically deformed, the amount of deformation is small.

The above supporting shaft 98 functions as a support for rotatably supporting the wheel 99 located within the groove 53 to the movable console 14 located outside the groove 53.

The other configuration than that described above is the same as that in the first embodiment. So, like reference numbers refer to like members or portions in the first embodiment.

It the manner as described above, the sliding structure for the movable console 14 according to the second embodiment is designed. The load having various magnitudes is applied to the movable console 14 in the vertical direction, and is transmitted to the groove 53 of the rail 50 through the retainer 90, supporting shaft 98, bearing 100, wheel 99 and elastic deforming portion 101. When the elastic deforming portion 101 is elastically deformed in the vertical direction, correspondingly, the wheel 99, bearing 100, supporting shaft 98 and ascending/descending portion 92 ascends or descends.

The above sliding structure operates in different manners according to the cases where the overload is applied to the movable console 14 and is not applied thereto.

<Case Where an Overload is not Applied>

In this case, as seen from FIG. 8, the amount of elastic deformation in the vertical direction of the elastic deforming portion 101 is small (inclusive of zero) and so the ascending/descending portion 92 leaves upward the bottom 61 (pressure receiving portion) of the tray 60. The ascending/descending portion 92 does not slide on the bottom 61 so that friction due to the sliding is not generated. Further, the friction generated between the cylindrical elastic deforming portion 101 and the inner bottom 53a of the groove 53 is small.

Thus, when force in the front-and-rear direction is applied to the movable console 14, this force is transmitted to the bearing 100, wheel 99 and elastic deforming portion 101 through the retainer 90 and supporting shafts 98. Even if the force is small, the elastic deforming portion 101 for each wheel 99 rolls on the inner bottom 53a of the groove 53. Since the load is small, the amount of elastic deformation of the elastic deforming portion 101 during rolling is small.

Owing to the above rolling, the contact area between the elastic deforming portion 101 and the groove 53 changes so that movable console 14 moves in the direction along the groove 53 (front-and-rear direction). Owing to this movement, the ascending/descending portion 92 moves in the same direction in a state separated upward from the bottom 61. Further, the supporting shaft 98 supporting the wheel 99 in a state separated from the inner wall 44 of the cover 40 and flexed segment 62 of the tray 60 moves along the opening 54 of the groove 53.

As described above, by slide-moving the movable console 14 along the groove 53, between the seats adjacent in the vehicle width direction, the position of the movable console 14 in the front-and-rear direction of the vehicle can be changed so that the range of employment of the movable console 14 expands.

<Case Where an Overload is Applied>

Figure 9:
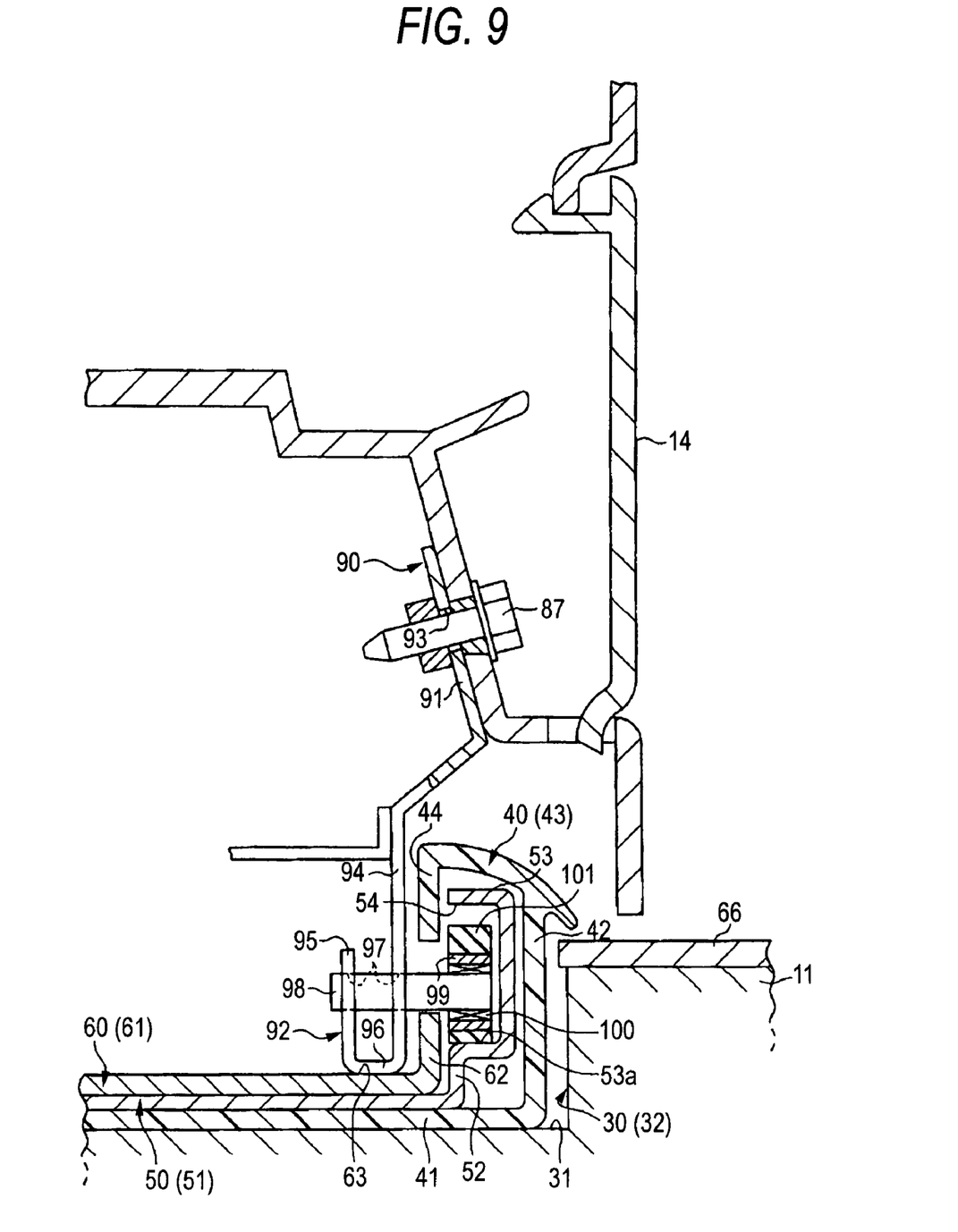
FIG. 9 is a view corresponding to FIG. 8, which is a partial longitudinal sectional view showing the state of the sliding structure when an overload is vertically applied to a movable console.

In this case, as seen from FIG. 9, the overload is transmitted to the inner bottom 53a of the groove 53 through the retainer 90, supporting shaft 98, bearing 100, wheel 99 and elastic deforming portion 101. In the process of transmission, owing to the overload, the elastic deforming portion 101, particularly, its part lower than the wheel 99 is elastically deformed in the vertical direction. Correspondingly, the wheel 99, bearing 100, supporting shaft 98 and retainer 90 descend. When the contact segment 96 of the ascending/descending potion 92 in the retainer 90 comes in contact with the pressure receiving plane 63 of the tray 60 so that the gap G becomes zero, a part of the overload is indirectly transmitted to the floor 11 of the vehicle through the tray 60, rail 50 and cover 40. This floor 11 is essentially high in rigidity so that a part of the overload is surely received by the floor 11 through the tray 60, rail 50 and cover 40. As a result, the load applied to the wheels 99 themselves, supporting shaft 98 supporting the wheels 99 to the movable console 14 or the areas of the groove 53 in contact with the elastic deforming portions 101 is reduced.

At the time of the above contact, at the contact segment 96 which is nearly in parallel to the pressure receiving plane 63, the ascending/descending portion 92 comes in plane-contact with the planar pressure receiving plane 63 of the bottom 61. Therefore, the overload is transmitted to the bottom 61 over a wide area so that the load applied to the pressure receiving plane 63 per unit area of the bottom 61 is reduced.

From the state of FIG. 9, when application of an overload to the movable console 14 ceases, for example, the man got on the movable console 14 gets down or the heavy object placed on the movable console 14 is shifted to another place, the elastic deforming portion 101 tries to return to the original state owing to the elastic restoring force of itself. Correspondingly, the ascending/descending portion 92 ascends to leave upward the bottom 61 of the tray 60. In this way, the sliding structure returns to the state of FIG. 8 described above.

Thus, in accordance with the second embodiment, although the format of the elastic deforming portion 101 is different that in the first embodiment, the same effects as (1) and (5) to (9) in the first embodiment can be obtained. In addition, the following effects in place of the above (2) to (4) can be obtained.

(10) In place of the elastic deforming portions 73 each formed of the flat spring, the elastic deforming portion 101 made of an elastic member is formed on the entire outer periphery of the wheel 99.

For this reason, when an overload in the vertical direction is not applied to the movable console 14, the elastic deforming portion 101 is not entirely or almost elastically deformed so that the ascending/descending portion 92 can be separated upward from the bottom 61 (pressure receiving portion). The wheel 99 can be smoothly rolled in the groove 53 so that application of small force permits the movable console 14 to be moved in the front-and-rear direction.

Further, when an overload is vertically applied to the movable console 14, the elastic deforming portion 101 is elastically deformed in the vertical direction so that the ascending/descending portion 92 is lowered to come in contact with the bottom 61. Thus, a part of the overload can be received by the bottom 61.

Further, since the cylindrical elastic member is provided on the outer periphery of each the wheels 99, the sliding structure can be made more compact than the case (first embodiment) where the elastic deforming portions 73 are formed in the retainer 70.

Additionally, this invention can be embodied in further embodiments described in the following.

The sliding member has only to be slide-moved with small frictional state on the groove 53 of the rail 50. For this reason, the matter having a different structure from that of the wheels 86, 99 adopted in each of the embodiments described above, for example, balls made of metal rolling on the groove 53 may be adopted as the sliding member.

The number of the elastic deforming portions 73 in the retainer 70 in the first embodiment may be changed to one or three or more. In this case, the number of the supporting shafts 85 and wheels 86 are also changed.

When an overload is applied, the ascending/descending portion 72, 92 may be brought into contact with cover 40 or rail 50 in place of the tray 60. In this case, the object (cover 40 or rail 50) with which the ascending/descending portion 79, 92 comes in contact serves as the pressure receiving portion. Further, when an overload is applied, the ascending/descending portion 79, 92 may be directly brought into contact with the inner bottom 31 of the concave 30 so that the floor 11 serves as the pressure receiving portion and receives a part of the overload. Further, separately from these members, another member high rigidity may be arranged as the pressure receiving portion on the ascending/descending path of the ascending/descending portion 79.

This invention is also applicable as a sliding structure for a console other than the center console 12.

This invention is also applicable to a console which does not have the fixed console 13 but is constructed of only the movable console 14.

The rail 50 may be laid in at least one of the vehicle width direction and front-and-rear direction at a position different from that in the embodiments described above. Further, the rail 50 may be laid so that its groove 53 extends in a direction different from that in the embodiments described above.

This invention can be widely applied to the console of a transport other than the vehicle.

What is claimed is:

1. A console-sliding structure for slidably supporting a sliding member connected to a console by a rail, comprising:
an elastic deforming portion which is elastically deformed when an overload is vertically applied to said console and is restored to an original state when application of the overload ceases;
an ascending and descending portion which descends with elastic deformation of said elastic deforming portion and ascends with restoration thereof; and
a pressure receiving portion which is provided on an ascending and descending path of said ascending and descending portion and comes in contact with the ascending and descending portion descended to receive a part of said overload.

2. A console-sliding structure according to claim 1, wherein said sliding member is a wheel arranged in said rail.

3. A console-sliding structure according to claim 1, wherein
said sliding member is connected to said console through a retainer; and
said elastic deforming portion is provided in said retainer as a part of said retainer and formed of a flat spring elastically deformable in a vertical direction.

4. A console-sliding structure according to claim 3, wherein
said flat spring is extended in a direction along said rail from a body of said retainer, and
said sliding member is provided at the tip of said flat spring.

5. A console-sliding structure according to claim 4, wherein
a pair of said flat springs are formed on said retainer; and
said pair of flat springs are extended in directions along said rail from said body of the retainer and opposite to each other.

6. A console-sliding structure according to claim 2, wherein
said wheel is connected to the retainer connected to said console by a supporting shaft; and
said elastic deforming portion is formed of an elastic member formed on the entire periphery of said wheel.

7. A console-sliding structure according to claim 3, wherein said ascending and descending portion is formed as a part of said retainer.

8. A console-sliding structure according to claim 1, wherein said rail is provided with a groove having an opening on a side thereof; and said sliding member is arranged in said groove and connected to said console by a supporting segment intruding into said groove through said opening.

9. A console-sliding structure according to claim 1, wherein said pressure receiving portion has a planar pressure-receiving plane; and said ascending and descending portion has a contact segment which is formed substantially in parallel to said pressure-receiving plane and comes in plane-contact with said pressure receiving plane with descent of said ascending and descending portion.

10. A console-sliding structure according to claim 1, wherein said rail is laid between seats adjacent to each other in a width direction of a vehicle so as to extend in a traveling direction of the vehicle.

11. A console-sliding structure according to claim 10, wherein said pressure receiving portion is formed of a floor of said vehicle, or a structure placed on the floor.

* * * * *